United States Patent [19]

Larribe

[11] Patent Number: 4,549,864

[45] Date of Patent: Oct. 29, 1985

[54] APPARATUS FOR DRAPING LAYERS OF COMPOSITE MATERIALS

[75] Inventor: André P. Larribe, Le Pecq, France

[73] Assignee: Societe Nationale Industrielle et Aerospatiale, Paris, France

[21] Appl. No.: 618,247

[22] Filed: Jun. 7, 1984

Related U.S. Application Data

[62] Division of Ser. No. 408,996, Aug. 17, 1982, Pat. No. 4,487,730.

[30] Foreign Application Priority Data

Aug. 19, 1981 [FR] France .................... 81 15910

[51] Int. Cl.[4] .............................................. B28B 17/00
[52] U.S. Cl. .................................... 425/145; 425/173; 425/388
[58] Field of Search ................... 425/145, 173, 388; 264/40.1, 40.2, 510, 511, 553, 554, 546; 198/502

[56] References Cited

U.S. PATENT DOCUMENTS

| | | | |
|---|---|---|---|
| 2,451,483 | 10/1948 | Goldsmith | 154/110 |
| 3,126,431 | 3/1964 | Harder et al. | 264/40.1 |
| 3,465,384 | 9/1969 | Barchi et al. | 264/40.2 |
| 3,802,548 | 4/1974 | Wentz et al. | 198/370 |
| 3,982,625 | 9/1976 | Wentz et al. | 198/572 |
| 4,133,711 | 1/1979 | Augest et al. | 156/353 |
| 4,267,142 | 5/1981 | Lankheet | 264/553 |
| 4,382,762 | 5/1983 | Schepp | 264/40.1 |
| 4,459,093 | 7/1984 | Asano | 425/145 |

Primary Examiner—Jay H. Woo
Assistant Examiner—Timothy W. Heitbrink
Attorney, Agent, or Firm—Karl W. Flocks; Sheridan Neimark

[57] ABSTRACT

A process and apparatus for stacking layers of composite material on moulding equipment comprises a transfer band on which each of two opposed working sections has a surface suction device to hold on it a layer that has been placed in a precise position in register with an outline, projected onto the transfer band by means of neon tubes and a frosted glass plate in a first working station. The band transfers the layer to a second working station where the layer is isolated in a sealed enclosure by means of an inflatable joint carried by a frame facing a peripheral ridge surrounding the moulding equipment.

11 Claims, 4 Drawing Figures

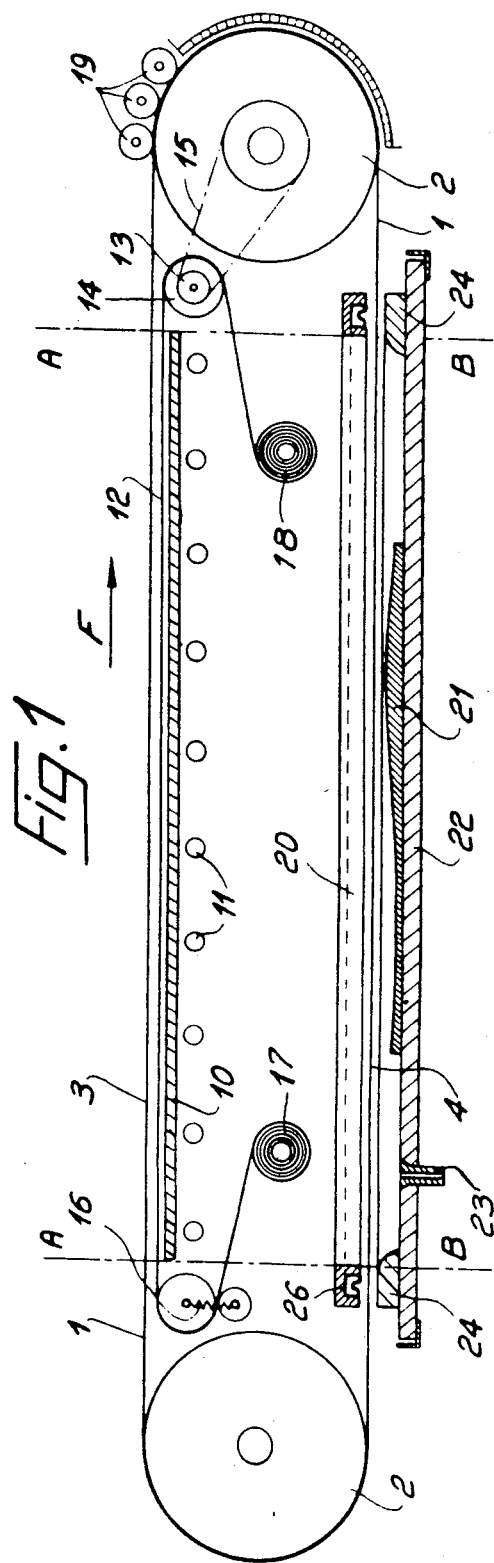
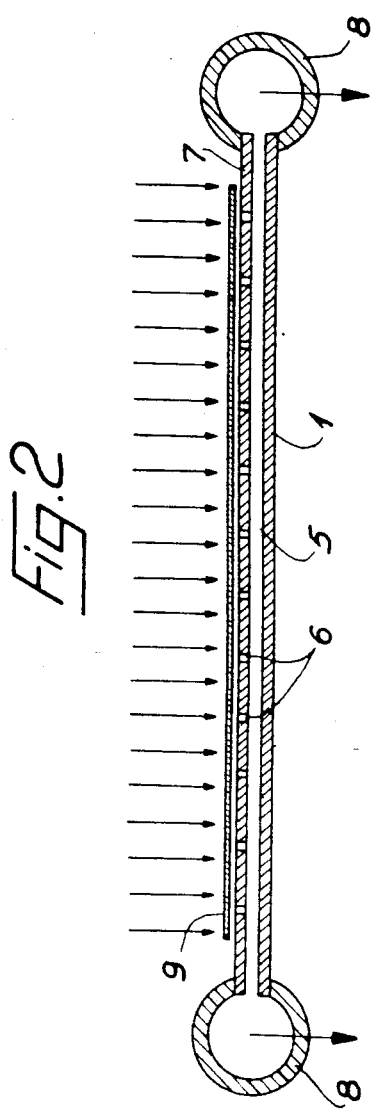

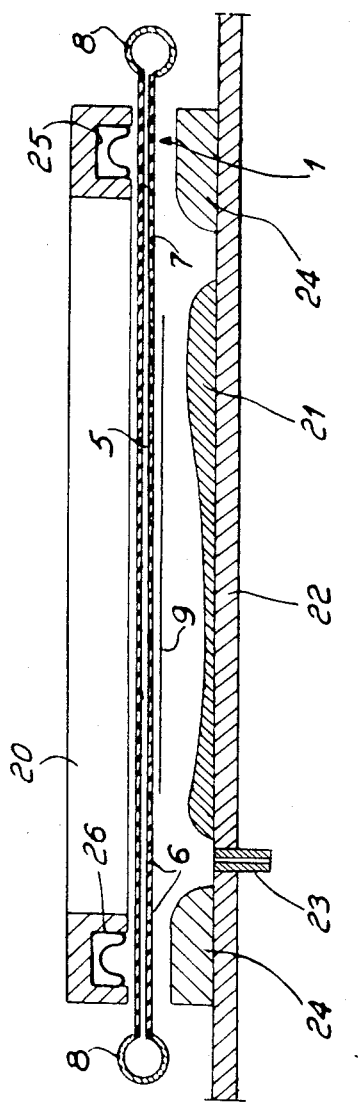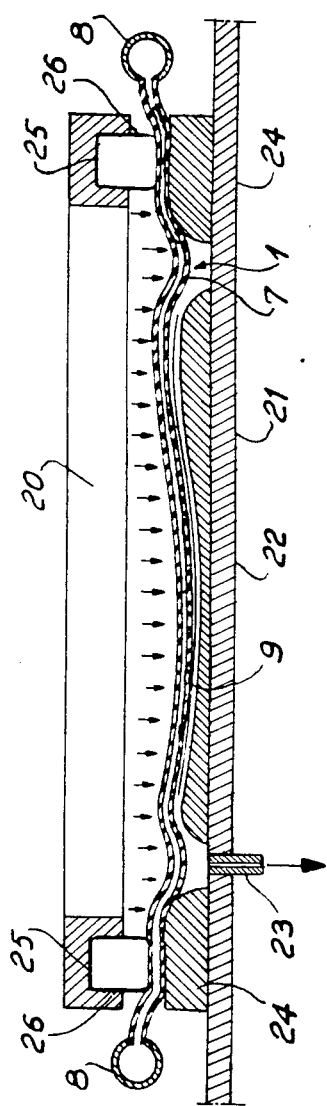

APPARATUS FOR DRAPING LAYERS OF COMPOSITE MATERIALS

This is a division of application Ser. No. 408,996 filed Aug. 17, 1982 now U.S. Pat. No. 4,487,730.

BACKGROUND OF THE INVENTION

The present invention relates to a process for the draping of layers made of composite materials, as well as to apparatus for carrying out the process of the invention.

It is known that sheets made of certain composite materials comprise a multiplicity of basic filaments of some microns in diameter, combined in strands of from 1000 to 6000 units approximately in order to form fibres which are placed side by side (so that the materials are anistotropic), then impregnated with a resin to form sheets which vary in width and from which it is possible to cut layers or panels to drape over moulding equipment or over a layer already draped on the equipment, the number of layers to be superimposed on one another being determined by the thickness of the desired article, while the respective and relative positions, shapes and sizes of the layers are determined by the shape of the desired article, which is obtained as the outcome of a physicochemical process of solidification of the various stacked layers, for example by polymerisation under pressure in an oven.

It is also known that it is necessary for the fibres of each layer to be orientated in the direction of the stresses to which the articles being made will be subjected, in order to provide the articles with the best possible mechanical properties, and that it is therefore imperative to ensure that this orientation is carried out with great care when the articles are being produced, especially during the stacking of the successive layers on the moulds or moulding equipment.

In the present state of the art, two processes are mainly carried out for the production of articles of composite materials by draping and stacking of layers.

One of these processes is carried out entirely manually: it consists in cutting, positioning and stacking on the moulding equipment the successive layers which go to make up a particular article. All these operations are carried out by hand. It is then necessary to enclose the stack of layers thus obtained in a sealed enclosure, in which a partial vacuum is formed, in order to eliminate any risk of air being trapped between the stacked layers, and the thicker the article, and thus the greater the numberof layers and possibly of reinforcements or inserts interpolated locally between two layers, the longer it is necessary to do this.

In addition, such manual draping only allows an approximate check on the orientation of the fibres of the stacked layers, particularly in the case of layers cut from a composite material with carbon fibres arranged unidirectionally, so that the mechanical properties of the article finally obtained cannot be guaranteed.

Finally, manual draping leads to long production times, and thus to excessive labour costs, which, added to high raw material costs, result in a prohibitive cost price for a not very reliable finished product, so that the ratio of output to cost achieved leads to a lack of commercial success.

The second process for producing articles made of composite materials by draping and stacking layers is basically carried out in a linear, continuous and automatic manner on one and the same machine, forming an automated and integrated computer-controlled production line.

According to this process, described in U.S. Pat. No. 4,133,711, a carrier material is arranged in a first working station, then a pre-programmed number of adjacent portions, each cut to a pre-programmed length from a web of composite material, are placed on the carrier material, their orientation being inclined with respect to a preferred direction of the carrier material, in order to produce a layer of composite material. Then the combination of the layer and the carrier material is transferred from the first working station to a second working station, at the same time as fresh carrier material is arranged in the first working station. The transferred layer is then cut according to a pre-programmed closed outline, while portions of the web of composite material, forming a new layer, are placed on the new support material in the first working station. The cutting that has been carried out is then compared with a desired cutting model and, in the event of agreement, the layer cut according to the desired model is transferred from the second working station onto a mould or moulding equipment, while the transfer of the new layer from the first working station to the second is begun.

The machine described in the above-mentioned Patent, for carrying out the process described above, comprises a transfer or conveyor arm travelling in a direction perpendicular to a depositing table, and beneath said arm there is mounted a transfer head equipped with a transverse gripper capable of grasping the end of a roll of carrier material in order to unroll a length of the latter onto the depositing table, which is provided with a suction device on a level with its receiving surface for the carrier material, a cutting tool then being moved transversely over the unrolled web of carrier material in order to cut from it a piece covering the depositing table. A depositing arm is then moved perpendicularly to the depositing table and a depositing head, mounted so as to rotate beneath a platform which is itself mounted so that it is transversely movable on the arm, comprises a feed cylinder on which are wound a web of composite material and a web of backing material, a separating device which separates the backing material from the composite material during the unwinding of the feed cylinder, a device for cutting the web of composite material in order to obtain pieces of the latter which will be juxtaposed, a guide device which leads the web of composite material towards a pressing cylinder which ensures that the web of composite material comes into contact with the depositing table, and a cylinder for rewinding the backing material.

After a layer has been produced, being deposited on the piece of support material covering the depositing table, the transfer is carried out by the transfer arm, the transfer head mounted under which is equipped with a suction device, which arm is actuated perpendicular to the assembly formed by the layer and the piece of carrier material, while the suction device of the depositing table is switched off, the transfer arm then being moved perpendicular to a cutting table, also provided with an actuated suction device while the suction device of the transfer head is switched off, in order that the assembly formed by the piece of carrier material and the layer may be deposited on the cutting table, the transverse gripper with which the transfer head is provided effecting, during the movement of the transver arm, the placing of a fresh piece of carrier material to cover the depositing table.

The layer is then cut according to a pre-programmed closed outline by means of a laser arranged under a cutting arm moved perpendicular to the cutting table, while the depositing arm and the depositing head produce another layer on the new length of carrier material arranged on the depositing table.

The comparison between the cutting carried out and the desired cutting model is effected by means of a scanning device equipped with a television camera projecting the image of the cutting carried out onto a video screen on which the comparison is made. If the cutting is correct the cutting table, on which the cut layer and the length of carrier material are held by means of the suction device, moves and tilts under the control of a rotary actuator so that the cut layer is deposited on a mould or on moulding equipment arranged on a moulding table adjacent to the cutting table. A pressing or discharging device with a bar brings the layer in contact with the mould in order to prevent any floating before the suction device of the tilted cutting table is switched off.

The various moving parts of the machine are controlled by a computer synchronising their movements and directing the execution of the sequence of operations.

This machine, complex in structure, is thus expensive to buy and also requires great care in operation, hence the maintenance costs are high.

Due to its volume, the machine occupies a consequently large area of floor space and requires a large installation area for industrial production of the finished products.

In addition, it is a machine which is very suited to the manufacture of long runs of articles of large dimensions, in order to achieve the lowest possible cost price. For the production of smaller articles in limited numbers the machine would lead to a high, and even prohibitive, cost price.

Note should also be taken of the scale and cost of the preparatory programming work and, finally, that this sophisticated machine is not entirely automatic in operation, since manual intervention is provided for to remove the off-cuts from the cut layers on the cutting table before the latter is tilted through 180°. This manual operation results in a slowing down of the course of operations and thus in an increase in the cost price of the finished products.

SUMMARY OF THE INVENTION

By means of the present invention it is proposed to eliminate the disadvantages arising when carrying out the processes mentioned above, particularly with respect to costs and the complexity of the equipment, and in particular to offer an intermediate solution between the completely manual manufacture of articles by the draping and stacking of layers or panels made of composite material, and the completely automated large-scale manufacture of large articles of this type.

More precisely, it is object of the invention to provide a process and equipment which, after manual placing of the layers on a carrier material, makes it possible to carry out automatically the accurate positioning, checking of said positioning, conveying, and stacking on to moulding equipment, of layers of any selected shape, made of composite materials, in order to produce an article of selected shape and thickness which has, in particular, good mechanical properties, said layers still being commonly termed "panels" or "sections" although within the framework of the invention they are pieces which are cut, not folded, according to a closed outline, of selected shape and size, from a sheet of suitable size made of a composite material, preferably with the fibres forming part of the composite material having a selected orientation in relation to the shape of the article.

The execution of the process according to the invention presupposes that on the one hand the cutting of the layers in the desired numbers, is carried out according to shapes corresponding to closed outlines, of the desired dimensions and with the desired orientation of the fibres, the cut layers possibly being stored stacked on top of each other, each being separated from the adjacent layer or layers by layers of a separating material and, on the other hand the outlines of the various layers are traced on a pattern.

The process according to the invention, for the draping of layers of composite materials over moulding equipment, comprises the steps of causing an image of the outline of a said layer to appear on a section of carrier material at a first station, depositing said layer on said section of carrier material in register with said image of its outline, transferring said section of carrier material to a second station opposite said moulding equipment while maintaining said layer in a fixed position relative to said section of carrier material, and producing a reduced pressure between said layer and said moulding equipment whereby said layer is placed and compacted on said moulding equipment or on another said layer previously draped thereover.

It is preferred that while said section of carrier material is in said second station, another section of said carrier material is at said first station.

The said portion of carrier material is advantageously transferred from the said first station to the said second station while the said other portion of carrier material is transferred from the said second station to the first.

A preferred embodiment of the process of the invention also comprises checking the orientation of each layer on its path while it is being transferred with the corresponding section of carrier material from the first station to the second, and in bringing about the return of the layer to the first working station in the event of incorrect orientation.

A further preferred feature of the process of the invention consists in projecting onto successive sections of carrier material arranged in the said first station the images of the outlines of the successive layers, previously traced on a transparent pattern.

In this case, the process preferably consists furthermore in imaging each outline on to the opposite face of the section of carrier material to the face on which the corresponding layer is deposited, the carrier material being transparent and the arrangement of the layer in juxtaposition with the image of its outline thus being permitted by the transparency of the section of carrier material.

The invention also provides apparatus for draping layers of composite material over moulding equipment, comprising a flexible and pliable transfer band of carrier material having at least one deformable working section of said band, at least two drums for driving said band, first and second working stations between said drums in which second working station said band faces said moulding equipment, driving means for actuating at least one of said drums to cause a said working section of said band to move from said first working station to said second working station, a pattern having thereon an outline of each said layer of composite material, projection means for imaging onto each said working section of said transfer band received in said first working station said outline from said pattern, to facilitate correct location of a said layer on a said working section of said band in said first working station, a support table for supporting said moulding equipment facing said second working station, a support on said support table surrounding said moulding equipment, an outlet in said support table, a reduced pressure source in communication with said outlet, and retractable pressure means for sealingly pressing a said working section against said support surrounding said moulding equipment, said working section, said moulding equipment, and said support table together defining a sealed reduced pressure chamber to deform a said working section of said transfer band, to place and compact a said layer on said moulding equipment or on a said layer previously placed and compacted thereon.

In a preferred embodiment, the support comprises a peripheral ridge carried by the support table round the moulding equipment and the reduced pressure outlet, and facing said ridge the apparatus then has retractable pressure means comprising an expanding body carried by a frame so that the working section of the transfer band received in the second working station, between the frame and the peripheral ridge of the support table can be compressed in a sealed manner on the peripheral ridge by the expansion of the expanding body. The latter consists, for example, of an inflatable seal or tube held in a groove provided in the frame facing the peripheral ridge.

According to one embodiment of the apparatus according to the invention, the pattern on which the outlines of the successive layers are traced is formed by a transparent film interpolated between a light source and the transfer band in the first work station. The light source preferably consists of a number of luminescent tubes with a frosted glass plate interpolated between the tubes and the transparent film.

The transparent film is advantageously unwound step by step from a supply reel, passing by way of a tensioning device comprising at least one roller by means of a return roller driven by way of a clutch device from the drive means of the transfer band, so that the outlines of the various layers are presented and arrested successively in the first working station facing a working section of the transfer band, then wound up on to a discharge roller.

In order to complete this embodiment, the working sections at least of the transfer band may be made of a transparent material, the image of the outlines of the layers then being projected on to the face of the working sections of the transfer band which is not intended to receive the layers, positioning of the latter in register with the images of their corresponding outlines thus being permitted by the transparency of the working sections of the transfer band.

In order to avoid any creasing or buckling of the layers arranged on the working sections of the transfer band, the working sections are preferably provided with a suction device producing a reduced pressure on a level with the surface intended to receive the layers.

In this case each suction device preferably comprises a number of apertures regularly spaced in the face of the working section of the transfer band intended to receive the layers, the apertures opening into channels bored through the thickness of the working section and in turn opening into tubes bordering the transfer band laterally and connected to a source of reduced pressure.

In order to effect the checking of the orientation of the layers over the whole width of the transfer band, the device has resistivity pick-ups mounted on at least two rollers coming into contact with the layers on their path between the first working station and the second, the pick-ups being sensitive to variations in the resistivity of the composite material between two contacts with constant spacing defined by the pick-up rollers. When the pick-ups detect that a layer is incorrectly orientated, they of course cause the layer to be moved in the opposite direction in order to bring the layer, and the working section of the transfer band which carries it, back to the first working station.

In a preferred embodiment, the transfer band is in the form of an endless belt led round two rotary drums with horizontal and parallel axes, the first and second working stations being respectively defined at the top and at the bottom between the two drums, and the transfer band having two working sections distanced from each other in such a way that when contacts carried by the transfer band stop the movement of the latter in a position in which one of the working sections is received in one of the working stations, the other working section is simultaneously received in the other working station.

The device for carrying out the process of the invention allows precise placing of layers of composite materials, either previously impregnated or not, based on glass, carbon or the material marketed under the brandname KEVLAR, for example, and the stacking of said layers on the moulding equipment without manual intervention.

Since the placing is carried out by means of reduced pressure, it eliminates the risk of air pockets being trapped between the various draped layers, while compacting them layer by layer, thus reducing swelling. When sheets of composite materials based on carbon fibres are used, it is absolutely essential to maintain the correct orientation of the draped layers if the mechanical properties of the finished product are to be guaranteed.

It should be noted that the detection system with which the device of the invention is provided not only makes it possible to bring about immediate cessation of the operation currently taking place in the event of a layer being incorrectly orientated, but also to do this if it should prove that a layer of separating material on this layer has been forgotten.

BRIEF DESCRIPTION OF THE DRAWINGS

FIG. 1 is a diagrammatic sectional view of the draping apparatus according to the invention.

FIG. 2 is a view in cross-section of the transfer band of the device according to FIG. 1, in a first working station.

FIG. 3 is a view in cross-section of the transfer band carrying a layer opposite the enclosure containing the draping equipment in a second working station, and FIG. 4 is an identical view to FIG. 3, showing the placing and compacting of a layer on the draping equipment.

DETAILED DESCRIPTION OF THE INVENTION

With reference to FIGS. 1 to 4, the apparatus comprises a transfer band 1, formed from a rectangular band of very transparent silicone elastomer, the ends of which have been joined to form a flexible and pliable endless belt. Said transfer band 1 is mounted on two cylindrical drums 2 of the same diameter mounted to rotate about parallel axes arranged in a horizontal plane and driven in rotation by an electric motor (not shown). In this way the two parts of the transfer band 1 which face each other between said two drums 2 and at some distance from the latter are flat, horizontal sections arranged one above the other, the upper part and the lower part being respectively received in a first and a second working station AA and BB defined between said drums 2. On said transfer band 1 there are defined two working sections 3 and 4 which are rectangular, not adjacent, of the same length, and arranged in such a way that when said first working section 3 is in said first working station AA, said second working section 4 is in said second working station BB and vice versa. Contacts (not shown) carried by said transfer band 1 make it possible to stop said drive of said band 1 in the direction of the arrow F by said drums 2 when said two working sections 3 and 4 are situated in said two working stations AA and BB.

Level with said two working sections 3 and 4, said transfer band 1 has a network of transverse channels 5 passing in a transverse direction through the thickness of said transfer band, and into said channels there opens a network of apertures 6 bored at constant intervals of the order of 20 to 30 mm in the outer face 7 of said working sections 3 and 4, with respect to the loop defined by said transfer band 1, corresponding to the upper face when said sections 3 and 4 are situated in the first working station AA, said outer face 7 forming the supporting face intended to receive a layer 9 of composite material previously cut according to the desired outline and freed from any layer of separating material which might be provided. Said transverse channels 5 in turn open at their two ends into two rubber tubes 8, each of which borders one side of said transfer band 1, overlapping the latter. Said two tubes 8 are connected to a source of reduced pressure as soon as the draping device is set in operation, so that said transverse channels 5 and said apertures 6 produce a reduced pressure on said outer surface 7 of said working sections 3 and 4 of said transfer band 1, said reduced pressure co-operating with atmospheric pressure to hold a said layer 9, deposited manually on said outer face 7, correctly in position without creases or buckling or swelling on said face, as shown in FIG. 2.

Beneath said transfer band 1 in said first working station AA there is arranged a frosted glass plate 10 which can be lit from below by neon tubes 11. In the narrow gap between said frosted glass plate 10 and said transfer band 1 in said first working station AA a transparent film 12 is caused to move in the same direction as said transfer band 1 and to stop temporarily beneath one of said working sections 3 and 4 when the latter is situated in said first working station AA. Said transparent film 12 is a pattern on which have been previously traced, in desired positions and with desired orientations, the outlines of the cutting of the different successive layers 9 which go to make up an article, and an image of these outlines is projected by said projection device produced by means of said neon tubes 11 and said frosted glass 10 onto the inner face of said working section 3 or 4 in position in said first working station AA, said image of said outline appearing on said outer face 7 of said working section 3 or 4 because of the transparency of the material of which said transfer band is composed.

The movement of said transparent film 12 is effected by said electric drive motor for said drums 2 by way of a magnetic clutch 13, shown diagrammatically on the rotary drive shaft of a return roller 14, and of a drive belt 15 connecting said clutch 13 to the rotary drive shaft of one of said drums 2. Said return roller 14 is arranged at the outlet of said gap between said frosted glass plate 10 and said transfer band 1 through which said transparent film 12 passes, and at the entry of which said gap said film is guided by a tensioning device 16 comprising a resiliently controlled roller and receiving said film from a supply roller 17, whilst said film is wound on to a discharge roller 18 after passing round said return roller 14.

At the start of the sequence of operations the speed of travel of said film 12 is the same as that of said transfer band 1, but the arresting of one of the two movable elements formed by said film and said band may be effected independently of the arresting of the other. On one side edge of said film 12, over the whole length of the latter, a strip some centimeters wide is reserved for information coding, either in the form of perforations if the coding is read by means of electrical contacts, or in the form of markings if optical readers are used. The information in particular controls the stopping of said film 12 and also deals with the orientation of said layer 9 and the checking of said orientation.

Checking is based on the variation in resistivity shown by a composite material between two contact points of a resistivity pick-up separated by a constant distance. Measurements may be carried out at an angle of 0°, that is to say in the direction of the fibres, or at an angle of up to 90°, that is to say perpendicular to the direction of said fibres. Said resistivity varies with a wide amplitude, according to a sinoidal form, taking into account chance contacts obtained on fibres or on the resin of the matrix which has a very high resistivity. By means of a dividing bridge, this sinusoidal variation in resistivity is transformed into a voltage which, after amplification, is capable of actuating electrical control devices. Resistivity pick-ups are mounted on three rollers 19, coming into contact with the outer face of said transfer band 1 on its path between said first working station AA and said second working station BB, for example level with the appropriate said drive drum 2. The pick-ups check, over the whole width of said transfer band 1, the orientation of said layers 9 deposited on said working sections 3 and 4, and also, if necessary, whether a layer of separating material which covers the sheets of composite material for storage has been forgotten.

Level with said second working station BB, said transfer band 1 is interpolated between, on the one hand, a frame 20 which is rectangular in shape, slightly longer than said working station BB and slightly narrower than said transfer band 1, arranged on the side of said inner face of said band, and, on the other hand, said moulding equipment 21, carried on a support table 22 arranged on the side of said outer face of said transfer band, with a reduced pressure outlet 23 passing through it, said moulding equipment 21 and the opening of said reduced pressure outlet 23 towards said transfer band 1 being surrounded by a peripheral ridge 24 also carried by said support table 22 facing said frame 20. The face of said frame 20 pointing towards said transfer band 1 and said peripheral ridge 24 has a groove 25, in the bottom of which there is held an inflatable seal or tube 26 which can be connected with a pressurisation means, for example, a compressed air source, or with a reduced pressure source.

Starting from its uninflated position, shown in FIG. 3, if said joint or tube 26 is connected to said pressurisation means it swells up, pressing and then compressing said transfer band 1 against said peripheral ridge 24 over the whole circumference of the latter in such a way as to define between said transfer band, said peripheral boss, said support table 22, and said moulding equipment 21 a sealed chamber in which a reduced pressure can be produced by means of said reduced pressure outlet 23, as shown in FIG. 4. Since atmospheric pressure presses on said inner face of the part of said transfer band 1 surrounded by said frame 20, this part is then pressed towards said support table 22 against said moulding equipment 21 onto which there is thus transferred any said layer 9 carried by a said working section 3 or 4 situated in the position of this part of said transfer band 1. Said tube 26 is returned to the uninflated position by connecting it for a few moments to a reduced pressure source, or, if said tube is made of resilient material and the resilient return is sufficient for proper withdrawal of said tube 26 above said transfer band 1, by allowing it to communicate with the atmosphere.

It thus appears that the part of said apparatus in said first working station AA is reserved for the manual depositing and positioning of said layers 9 on said working sections 3 and 4 of said transfer band 1, in register with the images of their respective outlines, while the part in said second working station BB is reserved for the placing, under vacuum, and the compacting of said layers 9 on said moulding equipment 21.

The apparatus of which the structure has been described above operates in the following manner: Said supply roller 17 for said transparent film 12, carrying said outlines of said layers 9, is arranged on the machine. Said film 12 is then unwound round said tensioning device 16 and said return roller 14, which drives it, and rewound on said discharge roller 18, in such a way as to cause said outline of the first said layer 9 to appear in a suitable position, determined by said coding on said film 12, in said first working station AA, while one working section, for example 3, of said transfer band 1 is simultaneously also led into the said first working station AA. Said film 12 and said transfer band 1 are then stopped, facing one another, in these positions, and said image of said outline of said first layer 9 is projected by means of said neon tubes 11 and said frosted glass 10 onto said inner face of said working section 3, and appears clearly on said outer face 7 of said working section, due to said transparency of said silicone elastomer of which said transfer band is composed. The operator can then deposit on said outer face 7 of said working section 3 said first said layer 9 corresponding to said projected outline, freed from any separating layer, and position it in register with said projected outline.

Then said transparent film 12 and said transfer band 1 are driven in said direction of said arrow F, carrying along, towards said checking rollers 19, said first layer 9, held in a suitable position on said outer face 7 of said working section 3 by said reduced pressure device with which said working section is equipped.

If the orientation of the fibres of said layer 9 is incorrect, said first working section 3 and said film 12 are moved in the opposite direction and returned to their starting position, so that said operator can correct the position of said layer 9.

On the other hand, if the information given by said checking pick-ups with which said rollers 19 are provided agrees with the first lot of said coded information giving the orientation required for said layer 9, and read on said coded edge of the film 12, said transfer band 1 continues its travel until said first working section 3 is brought into position in said second working station BB.

During this time, the reading of said second lot of coded information on said film 12 controls the stopping of said film in the following position, in which said outline of the second said layer 9 is arranged in said first working station AA independently of said movement of said transfer band 1.

The said contact determining the stopping of said first working section 3 in said second working station BB in order to place said first layer 9, transported on said section 3, on said moulding equipment 21, and then compact it, at the same time triggers timed relays actuating electronic valves (not shown) simultaneously connecting said tubes 8 of said reduced pressure device of said working section with the open air and effects the pressurisation of said seal or tube 26 which then compresses said transfer band 1 against said peripheral ridge 24 of said support table 22.

Said chamber defined between said support table 11 and said outer face 7 of said first working section 3 is thus sealed off, then a vacuum is produced therein by connecting said reduced pressure outlet 23 with a reduced pressure source, thus forcing said transfer band 1, which is flexible and pliable, to drape said first layer 9, freed by said reduced pressure device of said first working section 3, and mould it to said moulding equipment 21 with sufficient pressure to compact said layer 9 and prevent any air being trapped between said layer and said moulding equipment.

Starting from said stopping of said transfer band 1 with said first working section 3 in said second working station BB, and thus with said second working section 4 in said first working station AA, and during the dwell time determining the duration of said compacting of said first said layer 9 on said moulding equipment 21, said operator can position said second said layer 9 on said corresponding outline projected onto said outer face 7 of said second working section 4, and initiate a further draping sequence, which will begin at the end of said dwell time, coinciding with said deflation of said seal or tube 26 and the connection with the atmosphere of said chamber defined between said support table 22 and said working section of said transfer band 1 facing it.

The process and equipment according to the invention will be advantageously used for small batch manufacture of laminated articles made of composite materials, of relatively small dimensions, by stacking computing and solidifying a given number of layers cut from sheets of composite materials.

While a preferred embodiment of the present invention has been described, it should be understood that the invention is not limited thereto and is determined solely by the scope of the appended claims.

I claim:

1. Apparatus for draping layers of composite material over moulding equipment, comprising a flexible and pliable transfer band of carrier material having at least one deformable working section of said band, at least two drums for driving said band, first and second working stations between said drums in which second working station said band faces said moulding equipment, driving means for actuating at least one of said drums to cause a said working section of said band to move from said first working station to said second working station, a pattern having thereon an outline of each said layer of composite material, projection means for imaging onto each said working section of said transfer band received in said first working station said outline from said pattern, to facilitate correct location of a said layer on a said working section of said band in said first working station, a support table for supporting said moulding equipment facing said second working station, a support on said support table surrounding said moulding equipment, an outlet in said support table, a reduced pressure source in communication with said outlet, and retractable pressure means for sealingly pressing a said working section against said support surrounding said moulding equipment, said working section, said moulding equipment, and said support table together defining a sealed reduced pressure chamber to deform a said working section of said transfer band, to place and compact a said layer on said moulding equipment or on a said layer previously placed and compacted thereon.

2. The apparatus of claim 1, wherein said support comprises a peripheral ridge carried by said support table and extending round said moulding equipment and said outlet, and said retractable pressure means comprises a frame and an expansible body carried by said frame facing said ridge and there is provided pressure means to expand said expansible body to cause a said working section 4 of said transfer band, received in said second working station between said frame and said peripheral ridge of said support table, to be sealingly pressed against said ridge.

3. The apparatus of claim 2, wherein said frame defines a groove facing said peripheral ridge and said expansible body consists of an inflatable seal held in said groove.

4. The apparatus of claim 1, which comprises a light source and wherein said pattern having thereon said outlines consists of a transparent film interpolated between said light source and said transfer band in said first working station.

5. The apparatus of claim 4, wherein said light source consists of a plurality of luminescent tubes and a frosted glass plate interpolated between said luminescent tubes and said transparent film.

6. The apparatus of claim 4, comprising a supply roll for said transparent film, a tensioning device including at least one roller by way of which said film passes from said supply roll to said first working station, a discharge roller on which said film is rewound, a return roller, by way of which said film passes from said first working station to said discharge roller, and a clutch device for driving said return roller from said drive means for said transfer band to advance said film step by step to successively present and arrest said outlines of said layers in said first working station facing a said working section of said transfer band.

7. The apparatus of claim 1, wherein at least said working sections of said transfer band are made of a transparent material, the projection means is arranged to project said images of said outlines of said layers onto the surface of said working sections opposite to the layer-receiving surface.

8. The apparatus of claim 1, including a suction device provided for each said working section of said transfer band to produce a reduced pressure adjacent to the layer-receiving surface of the said working surface.

9. The apparatus of claim 8, wherein each said suction device comprises channels bored through the thickness of said working section, tubes laterally bordering said transfer band into which said channels open, and a reduced pressure source in communication with said tubes, and wherein the layer receiving surface defines at regular intervals apertures opening through said surface and opening into said channels.

10. The apparatus of claim 1, comprising at least two rollers coming into contact with said layers on their path between said first working station and said second working station, contacts on said rollers, resistivity pick-ups comprising said contacts, said pick-ups being sensitive to variations in the resistivity of said composite material between pairs of contacts at a constant distance from each other defined by said rollers for checking the orientation of said layers over the whole width of said transfer band, and control means arranged to bring about the return of a layer to the first working station in response to said pick-ups indicating that a said layer is incorrectly oriented.

11. The apparatus of claim 1, wherein said transfer band is an endless belt mounted on said two rotary drums, said drums have horizontal and parallel axes, said first and second working stations are respectively at the top and at the bottom between said two drums, and said transfer band has two said working sections distanced from each other in such a way that when one said working section is in one said working station the other said working section is in the other said working station.

* * * * *